United States Patent
Chen (10) Patent No.: US 12,081,388 B2
(45) Date of Patent: Sep. 3, 2024

(54) METHOD FOR PROCESSING BEAM FAILURE, AND TERMINAL

(71) Applicant: VIVO MOBILE COMMUNICATION CO., LTD., Guangdong (CN)

(72) Inventor: Li Chen, Chang'an Dongguan (CN)

(73) Assignee: Vivo Mobile Communication Co., Ltd., Guangdong (CN)

(*) Notice: Subject to any disclaimer, the term of this patent is extended or adjusted under 35 U.S.C. 154(b) by 194 days.

(21) Appl. No.: 17/035,080

(22) Filed: Sep. 28, 2020

(65) Prior Publication Data

US 2021/0014104 A1 Jan. 14, 2021

Related U.S. Application Data

(63) Continuation of application No. PCT/CN2019/078633, filed on Mar. 19, 2019.

(30) Foreign Application Priority Data

Mar. 28, 2018 (CN) .......................... 201810266175.5

(51) Int. Cl.
*H04L 41/0654* (2022.01)
*H04W 16/32* (2009.01)
*H04W 52/14* (2009.01)
*H04W 74/0833* (2024.01)
*H04W 74/0836* (2024.01)
*H04W 74/0838* (2024.01)

(52) U.S. Cl.
CPC ......... *H04L 41/0654* (2013.01); *H04W 16/32* (2013.01); *H04W 52/146* (2013.01); *H04W 74/0833* (2013.01)

(58) Field of Classification Search
None
See application file for complete search history.

(56) References Cited

U.S. PATENT DOCUMENTS

| | | | |
|---|---|---|---|
| 2016/0183233 A1 | 6/2016 | Park | |
| 2016/0353510 A1 | 12/2016 | Zhang et al. | |
| 2017/0302355 A1 | 10/2017 | Islam et al. | |
| 2018/0063883 A1 | 3/2018 | Nagaraja et al. | |
| 2018/0219604 A1 | 8/2018 | Lu et al. | |
| 2019/0037604 A1* | 1/2019 | Akkarakaran | H04L 5/001 |
| 2019/0089579 A1* | 3/2019 | Sang | H04W 76/27 |
| 2019/0199615 A1* | 6/2019 | Zhang | H04W 76/18 |

(Continued)

FOREIGN PATENT DOCUMENTS

| | | |
|---|---|---|
| CN | 107005858 A | 8/2017 |
| CN | 107079459 A | 8/2017 |
| CN | 107612602 A | 1/2018 |

OTHER PUBLICATIONS

CN Office Action in Application No. 201810266175.5 dated Sep. 30, 2020.

(Continued)

*Primary Examiner* — Liem H. Nguyen
(74) *Attorney, Agent, or Firm* — Price Heneveld LLP (57) ABSTRACT

A method for processing beam failure and a terminal are provided by the present disclosure. The method includes: determining a BFR event, wherein the beam failure recovery event includes an abnormality occurring in a BFR procedure or at least two cells both undergoing a BFR; executing a specific operation according to the BFR event.

20 Claims, 3 Drawing Sheets

(56) References Cited

U.S. PATENT DOCUMENTS

| | | | |
|---|---|---|---|
| 2019/0215863 A1* | 7/2019 | Kim | H04W 36/06 |
| 2019/0230529 A1* | 7/2019 | Sadiq | H04W 24/04 |
| 2019/0253941 A1* | 8/2019 | Cirik | H04W 36/0077 |
| 2019/0280756 A1* | 9/2019 | Fan | H04W 76/19 |
| 2019/0281480 A1* | 9/2019 | Wei | H04B 7/0617 |
| 2020/0036427 A1* | 1/2020 | Zhang | H04W 16/28 |
| 2020/0067589 A1* | 2/2020 | Jeong | H04B 17/309 |
| 2020/0153542 A1* | 5/2020 | Zhou | H04L 1/0009 |
| 2020/0177263 A1* | 6/2020 | Zhang | H04W 76/27 |
| 2020/0322813 A1* | 10/2020 | Jia | H04W 24/10 |
| 2020/0344621 A1* | 10/2020 | Xu | H04W 28/0278 |
| 2020/0367293 A1* | 11/2020 | Zhang | H04W 76/19 |
| 2020/0374853 A1* | 11/2020 | Guan | H04W 16/00 |
| 2020/0374960 A1* | 11/2020 | Deenoo | H04W 72/1284 |
| 2020/0383165 A1* | 12/2020 | Takahashi | H04W 74/0833 |
| 2020/0412437 A1* | 12/2020 | Cirik | H04W 76/28 |
| 2021/0014920 A1* | 1/2021 | Chen | H04W 76/18 |
| 2021/0022053 A1* | 1/2021 | Cirik | H04W 36/0079 |
| 2021/0029745 A1* | 1/2021 | Zhang | H04W 80/02 |
| 2021/0058130 A1* | 2/2021 | Zhu | H04W 74/0833 |
| 2021/0058133 A1* | 2/2021 | Takeda | H04W 72/23 |
| 2021/0058134 A1* | 2/2021 | Luo | H04W 74/0833 |
| 2021/0058797 A1* | 2/2021 | Yoshioka | H04W 24/04 |
| 2021/0068162 A1* | 3/2021 | Agiwal | H04L 5/0023 |
| 2021/0250794 A1* | 8/2021 | Wei | H04B 7/0617 |

OTHER PUBLICATIONS

"Relationship between beam failure recovery and RLF" 3GPP TSG RAN WG1 NR Ad Hoc Meeting, Jun. 27, 2017.

"Remaining issues and text proposals on mechanism to recover from beam failure" 3GPP TSG RAN WG1 Meeting AH 1801, Jan. 22, 2018.

"RLF for NR" 3GPP TSG-RAN WG2#100, Nov. 27, 2017.

Written Opinion and International Search Report in Application No. PCT/CN2019/078633 dated Oct. 8, 2020.

European Search Report dated Apr. 15, 2021 as received in application No. 19777240.3.

"Beam failure detection and recovery" 3GPP TSG-RAN WG2 Meeting #101, R2-1803230, Athens, Greece, Feb. 26-Mar. 2, 2018. Nokia.

"Discussion on the impact on beam failure recovery" 3GPP TSG-RAN WG2 Meeting #101, R2-1802006, Athens, Greece, Feb. 26-Mar. 2, 2018. Vivo.

"Summary of Discussion for NR Radio Link Monitoring" 3GPP TSG RAN WG1 Meeting #92, R1-1803487, Athens, Greece, Feb. 26-Mar. 2, 2018. Intel Corporation.

"Summary 2 on Remaining issues on Beam Failure Recovery" 3GPP TSG RAN WG1 Meeting #92, R1-1803441, Athens, Greece, Feb. 26-Mar. 2, 2018. Mediatek Inc.

* cited by examiner

METHOD FOR PROCESSING BEAM FAILURE, AND TERMINAL

CROSS-REFERENCE TO RELATED APPLICATION

The present application is a continuation application of PCT Application No. PCT/CN2019/078633 filed on Mar. 19, 2019, which claims a priority of the Chinese patent application No. 201810266175.5 filed on Mar. 28, 2018, which are incorporated herein by reference in their entirety.

TECHNICAL FIELD

The present disclosure relates to the field of communications technology, in particular to a method for processing beam failure and a terminal.

BACKGROUND

In $5^{th}$ generation ($5^{th}$ Generation, 5G) communications systems, beam failure may occur in high frequency communication due to fragility of link. Conventionally, beam failure instances are counted by using at least one of a counter and a timer, to enable beam failure detection. A conventional beam failure recovery procedure includes: beam failure detection, new candidate beam identification, beam failure recovery (Beam Failure Recovery, BFR) request transmission, and monitoring base station's response to the BFR request by the terminal. In other words, in conventional beam failure processing, BFR is performed as long as a beam failure occurs, without considering other factors. In practice, it is discovered that this manner of processing beam failure may lead to errors. Therefore, conventional terminals have poor performance of processing beam failure.

SUMMARY

In a first aspect, an embodiment of the present disclosure provides a method for processing beam failure. The method is applied to a terminal and includes:
  determining a beam failure recovery event, wherein the beam failure recovery event includes that an abnormality occurs in a beam failure recovery procedure or at least two cells both undergo a beam failure recovery;
  executing a specific operation according to the beam failure recovery event.

In a second aspect, an embodiment of the present disclosure provides a terminal. The terminal includes:
  a determination module, configured to determine a beam failure recovery event, wherein the beam failure recovery event includes that an abnormality occurs in a beam failure recovery procedure or at least two cells both undergo a beam failure recovery;
  an execution module, configured to execute a specific operation according to the beam failure recovery event.

In a third aspect, an embodiment of the present disclosure provides a terminal including a memory, a processor and a program stored in the memory and configured to be executed by the processor, wherein the processor is configured to execute the program to implement steps of the method for processing beam failure according to an embodiment of the present disclosure.

In a fourth aspect, an embodiment of the present disclosure provides a computer readable storage medium storing therein a program, wherein the program is configured to be executed by a processor to implement steps of the method for processing beam failure according to an embodiment of the present disclosure.

DETAILED DESCRIPTION

The following describes clearly the technical solutions according to the embodiments of the present disclosure with reference to the accompanying drawings in the embodiments of the present disclosure. It is apparent the embodiments in the following description are merely a part rather than all of the embodiments of the present disclosure. All other embodiments obtained by a person of ordinary skill in the art based on the embodiments of the present disclosure shall fall within the scope of the present disclosure. The expression "and/or" in the description and claims represents at least one of objects connected by the expression.

Figure 1:
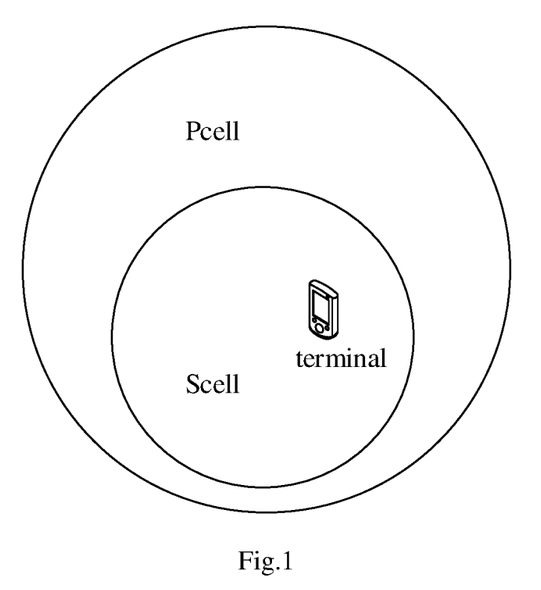
FIG. 1 is a structural diagram of a network system to which embodiments of the present disclosure may be applied.

Referring to FIG. 1, FIG. 1 is a structural diagram of a network system to which embodiments of the present disclosure may be applied. As shown in FIG. 1, the network system includes a terminal and at least one cell. The terminal may be user equipment (User Equipment, UE) or other terminal devices, e.g., a terminal side device such as a mobile phone, a tablet personal computer, a laptop computer, a personal digital assistant (Personal Digital Assistant, PDA), a mobile Internet device (Mobile Internet Device, MID) or a wearable device. It is noted, a specific type of terminal is not limited in embodiments of the present disclosure. The terminal may be within the coverage of one or more cells, and may establish a connection with one or more cells simultaneously. In addition, the at least one cell may include a secondary cell (Secondary Cell, SCell), and may further include a primary cell. The Scell may be an Scell in a carrier aggregation (Carrier Aggregation, CA) scenario, or an Scell in a master cell group (Master Cell Group, MCG) or secondary cell group (Secondary Cell Group, SCG) in a dual connectivity (Dual Connectivity, DC) architecture. The primary cell may be a primary cell (Primary Cell, Pcell) in a CA scenario, a Pcell in an MCG in the DC architecture, a primary secondary cell (Primary Secondary Cell, PScell) in an SCG, or a special cell (Special Cell, Spcell). Both the Pcell and the PScell may be referred to as Spcell. In addition, the Scell and the primary cell may correspond to the same base station, or in some scenarios, the Scell and the primary cell may correspond to different base stations as well, which is not limited. It is noted, in the drawing, a case in which at least one cell includes a Pcell and a Scell is taken as an example.

Figure 2:
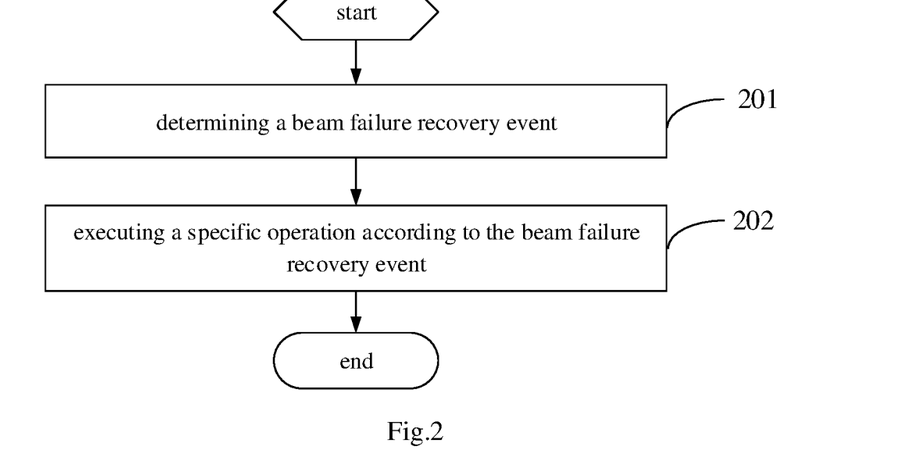
FIG. 2 is a flow diagram of a method for processing beam failure according to an embodiment of the present disclosure.

Referring to FIG. 2, FIG. 2 is a flow diagram of a method for processing beam failure according to an embodiment of the present disclosure. The method is applied to a terminal, and, as shown in FIG. 2, includes step 201 and step 202.

The step 201 includes: determining a beam failure recovery event, wherein the beam failure recovery event includes that an abnormality occurs in a beam failure recovery procedure or at least two cells both undergo a beam failure recovery.

That the abnormality occurs in the beam failure recovery procedure described above may be that an abnormality occurs in a beam failure recovery procedure or a beam failure recovery triggering process. The abnormality may be a cell beam failure, or that the abnormality occurs may be that a beam failure recovery is prevented or ignored, etc., which is not limited.

That at least two cells both undergo a beam failure recovery described above may be that at least two cells both trigger a beam failure recovery, or there is overlapped time between the beam failure recovery procedures performed in the at least two cells, or the like.

The determining a beam failure recovery event may include detecting an abnormality when the abnormality occurs in a beam failure recovery procedure, e.g., detecting that a cell undergoes a beam failure. Or, the determining a beam failure recovery event may include determining by the terminal that at least two cells both undergo a beam failure recovery.

The step 202 includes: executing a specific operation according to the beam failure recovery event.

The executing a specific operation according to the beam failure recovery event may include executing an operation corresponding to the beam failure recovery event. For example, a terminal preconfigures a correspondence between beam failure recovery events and operations, such that the specific operation may be executed according to the correspondence. Certainly, the correspondence may also be predefined in a technical specification, e.g., beam failure recovery events and their corresponding specific operations are predefined in a technical specification. Alternatively, the executing a specific operation according to the beam failure recovery event may include triggering the specific operation by the beam failure recovery event.

In embodiments of the present disclosure, the specific operation may include, but is not limited to: stopping a beam failure recovery procedure, reporting to an upper layer the beam failure occurring in the first cell, performing another beam failure recovery, ignoring the abnormality occurred, not triggering an indication of a beam failure recovery of the primary cell to an upper layer, not triggering a radio link failure (Radio Link Failure, RLF) by an upper layer, not starting a timer corresponding to a radio link monitoring (Radio Link Monitoring, RLM) or RLF, not performing an out-of-sync counting by an upper layer, or the like. The timer corresponding to the RLM or RLF may be an out-of-sync timer T310.

By means of the foregoing steps, a specific operation may be executed according to the beam failure recovery event. Therefore, in comparison with the solution in the related art that, without considering other factors, a beam failure recovery is performed as long as a beam failure occurs, embodiments of the present disclosure may improve beam failure processing performance of a terminal. For example, some beam failure recovery processes possibly incurring errors may be avoided, some erroneous counting or timing may be avoided, or the like.

As an optional implementation, that an abnormality occurs in a beam failure recovery procedure includes that a beam failure occurs in a first cell during a beam failure recovery procedure performed in the first cell, or a beam failure occurs in a second cell during the beam failure recovery procedure performed in the first cell.

That a beam failure occurs in the first cell during a beam failure recovery procedure performed in the first cell may include: a beam failure occurs in the first cell during at least one of following operations: transmitting a preamble message (msg1), having transmitted a msg1, monitoring a msg2, transmitting a msg3 and monitoring a msg4, that is, a beam failure occurs in the first cell when at least one of msg1, msg2, msg3 and msg4 is being transmitted or monitored in the first cell. No detailed description will be given for the case that a beam failure occurs in the second cell during the beam failure recovery procedure performed in the first cell. It is noted, the foregoing msg1, msg2, msg3, and msg4 are messages in a random access procedure, e.g., messages in the contention-free random access (Contention-Free Random Access, CFRA) procedure or contention based random access (Contention Based Random Access, CBRA) procedure.

Additionally, the beam failure recovery procedure performed in the first cell may be a beam failure recovery performed in the first cell for a beam failure in the second cell. Certainly, in some scenarios, the beam failure recovery procedure performed in the first cell may also be a beam failure recovery performed in the first cell for a beam failure in the first cell.

Optionally, in a case that the beam failure occurs in the first cell during the beam failure recovery procedure performed in the first cell, the specific operation includes at least one of:

stopping a beam failure recovery procedure being performed in the first cell;

stopping a beam failure recovery procedure being performed in the second cell;

stopping a beam failure recovery procedure being performed in the first cell and the second cell;

performing in the first cell a beam failure recovery for the beam failure occurring in the first cell;

reporting to an upper layer the beam failure occurring in the first cell;

performing in the first cell a beam failure recovery for the beam failure occurring in the first cell, and continuing performing a beam failure recovery procedure being performed in the first cell;

performing in the first cell a beam failure recovery for the beam failure occurring in the first cell after a beam failure recovery procedure being performed in the first cell is finished;

ignoring the beam failure occurring in the first cell.

In the implementation, it may be achieved that if a beam failure occurs in the first cell, at least one of the following operations may be performed: stopping a beam failure recovery procedure being performed in the first cell, stopping a beam failure recovery procedure being performed in the second cell, and stopping a beam failure recovery procedure being performed in the first cell and the second cell. In this way, the beam failure recovery procedure failure in the first cell and the second cell may be avoided, so as to improve the beam failure processing performance of a terminal.

Additionally, since a beam failure in the first cell may be reported to an upper layer if the beam failure occurs in the first cell, the beam failure may be detected accurately. Optionally, if the beam failure occurring in the first cell is reported to the upper layer, an RLF may be triggered, or an out-of-sync counter may be incremented, or a timer corresponding to an RLM or RLF may be started, so that the beam failure may be detected accurately. The timer corresponding to the RLM or RLF may be an out-of-sync timer T310.

Additionally, a beam failure recovery for the beam failure occurring in the first cell may be performed in the first cell, and a beam failure recovery procedure being performed in the first cell is continued. In this way, a beam failure recovery may be accomplished rapidly. Certainly, in this case, multiple RACH procedures, i.e., random access procedures, are required in the first cell. Further, a beam failure recovery for the beam failure occurring in the first cell may be performed in the first cell after a beam failure recovery procedure being performed in the first cell is finished. In this way, the beam failure recovery may be performed timely. In this case, there is no requirement for multiple RACH procedures in the first cell.

Additionally, the beam failure occurring in the first cell may be ignored, such that the beam failure recovery being performed in the first cell may be completed rapidly, and then the beam failure recovery for the beam failure occurring in the second cell may be completed rapidly since the beam failure recovery being performed in the first cell may be a beam failure recovery performed for the beam failure occurring in the second cell. Optionally, the ignoring the beam failure occurring in the first cell may include at least one of:
not triggering a beam failure recovery in the first cell;
not triggering in the second cell a beam failure recovery procedure for the beam failure occurring in the first cell;
not triggering in the first cell and the second cell a beam failure recovery procedure for the beam failure occurring in the first cell.

Optionally, in a case that the beam failure occurs in the second cell during the beam failure recovery procedure performed in the first cell, the specific operation includes at least one of:
ignoring the beam failure occurring in the second cell;
performing a beam failure recovery for the beam failure occurring in the second cell;
performing in the second cell a beam failure recovery, and continuing performing a beam failure recovery procedure being performed in the first cell;
performing in the second cell a beam failure recovery after a beam failure recovery procedure being performed in the first cell is finished.

In the implementation, it may be implemented that the beam failure occurring in the second cell is ignored, such that the beam failure recovery being performed in the first cell may be completed rapidly, and then the beam failure recovery for the beam failure occurring in the first cell may be completed rapidly since the beam failure recovery being performed in the first cell may be a beam failure recovery performed for the beam failure occurring in the first cell. Optionally, the ignoring the beam failure occurring in the second cell may include at least one of:
not triggering a beam failure recovery procedure in the second cell;
not triggering in the first cell a beam failure recovery procedure for the beam failure occurring in the second cell;
not triggering in the first cell and the second cell a beam failure recovery procedure for the beam failure occurring in the second cell.

Further, in the implementation, a beam failure recovery for the beam failure occurring in the second cell may be performed, so that a rapid recovery of beam failure in the second cell may be accomplished. Optionally, the performing the beam failure recovery for the beam failure occurring in the second cell may include at least one of:
triggering in the first cell a beam failure recovery procedure for the beam failure occurring in the second cell;
triggering in the second cell a beam failure recovery procedure for the beam failure occurring in the second cell;
triggering in the first cell and the second cell a beam failure recovery procedure for the beam failure occurring in the second cell.

Optionally, in embodiments of the present disclosure, the first cell is a primary cell, and the second cell is an Scell; or the first cell is an Scell, and the second cell is a primary cell; or the first cell is an Scell, and the second cell is another Scell.

Further, the primary cell may include at least one of: a Pcell, a Pcell in an MCG, a PScell in the SCG and an Spcell.

The foregoing implementations are described hereinafter by taking a case in which the first cell is a Pcell as an example.

When a beam failure recovery (Beam Failure Recovery, BFR) is being performed in the Pcell (including beam failure (Beam Failure, BF) in the Pcell, or BF in the Scell), for example, one of the following operations is being performed: transmitting a msg1, having transmitted a msg1, monitoring a msg2, transmitting a msg3 and monitoring a msg4, that is, at least one of msg1, msg2, msg3 and msg4 is being transmitted or monitored in the Pcell, if a beam failure occurs in the Pcell, UE has at least one of following behaviors:
the UE needs to stop a beam failure recovery procedure being performed in the Pcell (no matter whether it is a beam failure in the Pcell, or a beam failure in the Scell), specifically, the UE needs to stop an RACH procedure in the Pcell or an RACH procedure in the Pcell+Scell (Pcell+Scell refers to that the msg1, msg2, msg3 and msg4 may be transmitted and received in the Pcell and Scell respectively);
the UE needs to stop a beam failure recovery being performed in the Scell, specifically, the UE needs to stop an RACH procedure in the Scell;
further, the failure may be indicated to an upper layer, wherein the upper layer is configured to perform one of following operations: triggering an RLF, incrementing an out-of-sync counter T3xx+1, starting a timer corresponding to RLM/RLF;
the UE performs in the Pcell a beam failure recovery, and an original beam failure recovery is continued; at this time, multiple RACH procedures are required in the Pcell;
the UE performs in the Pcell a beam failure recovery after an original beam failure recovery fails or succeeds; at this time, there is no requirement for multiple RACH procedures in the Pcell.

At this time, if a beam failure occurs in the Scell, UE has at least one of following behaviors:
the UE ignores the beam failure occurring in the S cell and does not trigger a beam failure recovery procedure in the Scell, specifically, the UE does not perform an RACH procedure for beam failure recovery in the Scell;
the UE ignores the beam failure occurring in the S cell and does not trigger a beam failure recovery procedure in the Pcell, specifically, the UE does not perform an RACH procedure for beam failure recovery in the Pcell;
the UE ignores the beam failure occurring in the S cell and does not trigger a beam failure recovery procedure in the Pcell and Scell, specifically, the UE does not perform an RACH procedure for beam failure recovery in the Pcell+Scell;

the UE performs in the S cell a beam failure recovery, and an original beam failure recovery in the Pcell is continued; at this time, multiple RACH procedures are required in the Pcell and S cell;

the UE performs in the Scell a beam failure recovery after an original beam failure recovery in the Pcell fails or succeeds; at this time, there is no requirement for multiple RACH procedures in the Pcell and Scell.

The above description takes a case in which the first cell is a Pcell and the second cell is an Scell as an example, certainly, in embodiments of the present disclosure, the first cell may be an Scell and the second cell may be a Pcell. In other words, in another scenario, the Scell and Pcell in the foregoing example may be interchangeable, a detailed description thereof is omitted herein. Certainly, in some other scenarios, the first cell may be a cell in the MCG, and the second cell may be a cell in the SCG, or in other scenarios, the first cell may be a Pscell or Spcell and the second cell is an Scell. A detailed description of these scenarios is omitted herein. For a specific description, reference may be made to corresponding description of foregoing description of the case in which the first cell is a Pcell and the second cell is an Scell, and the same beneficial effects may be achieved.

As another optional implementation, that the abnormality occurs in the beam failure recovery procedure includes that the second cell undergoes a beam failure before a preamble is transmitted in the first cell, wherein the preamble is a preamble in a beam failure recovery procedure performed in the first cell after the first cell undergoes a beam failure; that the at least two cells both undergo the beam failure recovery includes that both the first cell and the second cell undergo a beam failure recovery.

That the second cell undergoes a beam failure before a preamble is transmitted in the first cell may include that the first cell undergoes a beam failure, and before a preamble is transmitted in the beam failure recovery procedure for the beam failure, the second cell also undergoes a beam failure. For example, after a recovery for the beam failure in the first cell is triggered and before a preamble is transmitted, the second cell also undergoes a beam failure.

That the first cell and the second cell both undergo the beam failure recovery may include that there is overlapped time between the beam failure recovery procedures occurring in the first cell and the second cell, or the first cell and the second cell undergo a beam failure recovery at the same time.

Optionally, in the implementation, the specific operation includes at least one of:

performing in a primary cell a beam failure recovery for the primary cell;

performing in the primary cell a beam failure recovery for an S cell;

performing in a cell with a specific candidate beam a beam failure recovery for the cell, wherein a random access resource corresponding to the specific candidate beam is a CFRA resource;

performing in the Scell a beam failure recovery for the Scell;

performing in the Scell a beam failure recovery for the primary cell;

performing a beam failure recovery in the primary cell and the S cell simultaneously;

performing in the primary cell a beam failure recovery for the primary cell and after the beam failure recovery is finished, performing in the Scell a beam failure recovery for the Scell, wherein the first cell is the primary cell and the second cell is the Scell, or the first cell is the Scell and the second cell is the primary cell.

The performing in the primary cell a beam failure recovery for the primary cell may include: transmitting in the primary cell a preamble corresponding to a primary cell candidate beam (e.g., Pcell candidate beam). The performing in the primary cell a beam failure recovery for the Scell may include: transmitting in the primary cell a preamble corresponding to an Scell candidate beam (e.g., Scell candidate beam). In this way, it may be achieved that the beam failure recovery for the primary cell and/or Scell is performed in the primary cell.

The performing in the Scell a beam failure recovery for the Scell may include: transmitting in the Scell a preamble corresponding to an Scell candidate beam (e.g., Scell candidate beam). The performing in the Scell a beam failure recovery for the primary cell may include: transmitting in the Scell a preamble corresponding to a primary cell candidate beam (e.g., Pcell candidate beam). In this way, it may be achieved that the beam failure recovery for the primary cell and/or Scell is performed in the Scell.

By performing in a cell with a specific candidate beam a beam failure recovery for the cell, it may be achieved that beam failure recovery for the cell is performed by using a CFRA resource, thereby accomplishing beam failure recovery rapidly. The random access resource may be a physical random access channel (Physical Random Access Channel, PRACH) resource.

Additionally, it may be achieved that a beam failure recovery is performed in the primary cell and the Scell simultaneously; or a beam failure recovery for the primary cell is performed in the primary cell and after the beam failure recovery is finished, a beam failure recovery for the Scell is performed in the Scell, thereby a rapid completion of beam failure recovery may be accomplished.

It is noted, in embodiments of the present disclosure, at the end of a beam failure recovery, two situations may result, namely, the beam failure recovery fails and the beam failure recovery succeeds.

Optionally, the performing in the primary cell the beam failure recovery for the primary cell includes: in a case that multiple cells each have a candidate beam whose corresponding random access resource is a CFRA resource, performing in the primary cell the beam failure recovery for the primary cell. The performing in the Scell the beam failure recovery for the Scell includes: in a case that multiple cells each have a candidate beam whose corresponding random access resource is a CFRA resource, performing in the Scell the beam failure recovery for the Scell.

In the implementation, it may be achieved that if multiple cells each have a candidate beam whose corresponding random access resource is a CFRA resource, the beam failure recovery for the primary cell may be performed in the primary cell, thereby the beam failure recovery for the primary cell may be accomplished rapidly; and it may be achieved that if multiple cells each have a candidate beam whose corresponding random access resource is a CFRA resource, the beam failure recovery for the Scell may be performed in the Scell, thereby the beam failure recovery for the S cell may be accomplished rapidly.

Optionally, in the foregoing implementation describing specific operation, in the foregoing specific operation, in a case that a beam failure recovery is performed in a cell, a beam failure in another cell is ignored or a beam failure recovery in another cell is prevented. In this way, it may be achieved that during the specific operation, beam failure recovery is only performed in one cell, thereby a rapid recovery of beam failure occurring in a cell may be accomplished. For example, the specific operation may include: performing in a primary cell a beam failure recovery for the primary cell; performing in the primary cell a beam failure recovery for an Scell; performing in a cell with a specific candidate beam a beam failure recovery for the cell; performing in the Scell a beam failure recovery for the Scell; performing in the Scell a beam failure recovery for the primary cell; or performing in the primary cell a beam failure recovery for the primary cell and after the beam failure recovery is finished, performing in the Scell a beam failure recovery for the Scell.

Optionally, in the foregoing implementation describing specific operation, in the foregoing specific operation, in a case that an uplink transmission power of the terminal cannot support preamble transmission in two cells, a beam failure recovery is only performed in one cell in the specific operation. In this way, it may be achieved that during the specific operation, beam failure recovery is only performed in one cell, thereby a rapid recovery of beam failure occurring in a cell may be accomplished. For example, the specific operation may include: performing in a primary cell a beam failure recovery for the primary cell; performing in the primary cell a beam failure recovery for an Scell; performing in a cell with a specific candidate beam a beam failure recovery for the cell; performing in the Scell a beam failure recovery for the Scell; performing in the Scell a beam failure recovery for the primary cell; or performing in the primary cell a beam failure recovery for the primary cell and after the beam failure recovery is finished, performing in the Scell a beam failure recovery for the Scell.

Optionally, in the foregoing implementation describing specific operation, in the foregoing specific operation, in a case that an uplink transmission power of the terminal supports preamble transmission in two cells, a beam failure recovery is performed in the two cells simultaneously in the specific operation. In this way, it may be achieved that the beam failure recovery procedures for two cells are completed rapidly. For example, a beam failure recovery is performed in the primary cell and the Scell simultaneously.

Hereinafter, the foregoing implementations describing specific operation are described by taking the Pcell and Scell as an example.

In a case that a beam failure recovery occurs in a Pcell and an Scell (or a PScell/Spcell and an Scell, or a cell in an MCG and a cell in an SCG) simultaneously, or in a case that a beam failure occurs in a cell and before a preamble is transmitted in the corresponding beam failure recovery procedure, another cell also undergoes a beam failure, UE has at least one of following behaviors:

1. performing in a Pcell a beam failure recovery for the Pcell, which includes transmitting in the Pcell a preamble corresponding to a Pcell candidate beam;
2. performing in the Pcell a beam failure recovery for an Scell, which includes transmitting in the Pcell a preamble corresponding to an Scell candidate beam;
3. performing in a cell with a candidate beam whose corresponding PRACH resource is a CFRA resource a corresponding beam failure recovery;
4. in a case that multiple cells each have a candidate beam whose corresponding PRACH resource is a CFRA resource, performing in the Pcell a corresponding beam failure recovery;
5. performing in the Scell a beam failure recovery for the Scell, which includes transmitting in the Scell a preamble corresponding to an Scell candidate beam;
6. performing in the Scell a beam failure recovery for the Pcell, which includes transmitting in the Scell a preamble corresponding to a Pcell candidate beam;
7. in a case that multiple cells each have a candidate beam whose corresponding PRACH resource is a CFRA resource, performing in the Scell a corresponding beam failure recovery;
8. performing a beam failure recovery in the Pcell and the Scell simultaneously, at this time, multiple RACH procedures are required in the Pcell and Scell;
9. performing a beam failure recovery for the Pcell firstly and after the beam failure recovery in the Pcell fails or succeeds, performing a beam failure recovery for the Scell, at this time, there is no requirement for multiple RACH procedures in the Pcell and Scell.

For the above behaviors 1 to 7, the following behavior is further included: after a beam failure recovery is performed for a corresponding cell, preventing/ignoring a beam failure recovery triggered by another cell. Alternatively, for the above behaviors 1 to 7, the following behavior is further included: in a case that an uplink transmission power of UE is not adequate for preamble transmission in two cells, selecting any one of the above behaviors 1 to 7. For the above behavior 8, the following behavior is further included: the UE behavior 8 is only permitted in a case that an uplink transmission power of UE is adequate for preamble transmission in two cells; otherwise, any one of behaviors 1 to 7 or behavior 9 is permitted.

As another optional implementation, if that the abnormality occurs in the beam failure recovery procedure includes that a beam failure recovery in a primary cell is prevented or ignored, the specific operation includes cancelling at least one of following operations:

triggering an indication of a beam failure recovery of the primary cell to an upper layer;
triggering an RLF by an upper layer;
starting a timer corresponding to an RLM or RLF;
performing an out-of-sync counting by an upper layer.

The cancelling at least one of above operations may be understood as not performing at least one of above operations, e.g., not triggering an indication of a beam failure recovery of the primary cell to an upper layer, not triggering an RLF by an upper layer, not starting a timer corresponding to an RLM or RLF, or not performing an out-of-sync counting by an upper layer.

The primary cell may be at least one of a Pcell, a Pscell and a Spcell.

In the implementation, since the foregoing operations are cancelled, erroneous detecting, counting and timing may be avoided, so as to improve beam failure processing performance of a terminal.

It is noted, the foregoing method may be applied to a 5G system or a $4^{th}$ generation ($4^{th}$ Generation, 4G) system, which is not limited. As long as substantially the same function may be achieved, the method may be applied to other communications system. For example, the method may be applied to a $6^{th}$ generation ($6^{th}$ Generation, 6G) system, other communications system in which beam failure detection or beam failure recovery is applied, or the like.

In embodiments of the present disclosure, a beam failure recovery event is determined, wherein the beam failure recovery event includes that an abnormality occurs in a beam failure recovery procedure or at least two cells both undergo a beam failure recovery; and a specific operation is executed according to the beam failure recovery event. Since a specific operation is executed according to the beam failure recovery event, beam failure processing performance of a terminal may be improved.

Figure 3:
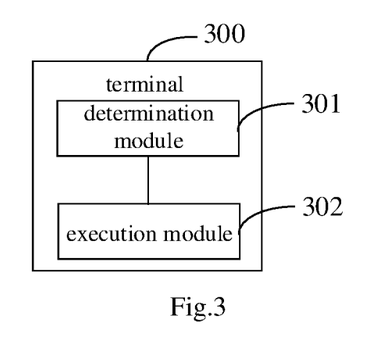
FIG. 3 is a structural diagram of a terminal according to an embodiment of the present disclosure.

Referring to FIG. 3, FIG. 3 is a structural diagram of a terminal according to an embodiment of the present disclosure. As shown in FIG. 3, a terminal 300 includes:
  a determination module 301, configured to determine a beam failure recovery event, wherein the beam failure recovery event includes that an abnormality occurs in a beam failure recovery procedure or at least two cells both undergo a beam failure recovery;
  an execution module 302, configured to execute a specific operation according to the beam failure recovery event.

Optionally, that the abnormality occurs in the beam failure recovery procedure includes that a beam failure occurs in a first cell during a beam failure recovery procedure performed in the first cell, or a beam failure occurs in a second cell during the beam failure recovery procedure performed in the first cell.

Optionally, in a case that the beam failure occurs in the first cell during the beam failure recovery procedure performed in the first cell, the specific operation includes at least one of:
  stopping a beam failure recovery procedure being performed in the first cell;
  stopping a beam failure recovery procedure being performed in the second cell;
  stopping a beam failure recovery procedure being performed in the first cell and the second cell;
  performing in the first cell a beam failure recovery for the beam failure occurring in the first cell;
  reporting to an upper layer the beam failure occurring in the first cell;
  performing in the first cell a beam failure recovery for the beam failure occurring in the first cell, and continuing performing a beam failure recovery procedure being performed in the first cell;
  performing in the first cell a beam failure recovery for the beam failure occurring in the first cell after a beam failure recovery procedure being performed in the first cell is finished;
  ignoring the beam failure occurring in the first cell;
  in a case that the beam failure occurs in the second cell during the beam failure recovery procedure performed in the first cell, the specific operation includes at least one of:
    ignoring the beam failure occurring in the second cell;
    performing a beam failure recovery for the beam failure occurring in the second cell;
    performing in the second cell a beam failure recovery, and continuing performing a beam failure recovery procedure being performed in the first cell;
    performing in the second cell a beam failure recovery after a beam failure recovery procedure being performed in the first cell is finished.

Optionally, in case of reporting to the upper layer the beam failure occurring in the first cell, an RLF is triggered, an out-of-sync counter is incremented, or a timer corresponding to an RLM or RLF is started;
  the ignoring the beam failure occurring in the second cell includes at least one of:
    not triggering a beam failure recovery procedure in the second cell; not triggering in the first cell a beam failure recovery procedure for the beam failure occurring in the second cell;
    not triggering in the first cell and the second cell a beam failure recovery procedure for the beam failure occurring in the second cell;
  the ignoring the beam failure occurring in the first cell includes at least one of:
    not triggering a beam failure recovery in the first cell; not triggering in the second cell a beam failure recovery procedure for the beam failure occurring in the first cell;
    not triggering in the first cell and the second cell a beam failure recovery procedure for the beam failure occurring in the first cell;
  the performing the beam failure recovery for the beam failure occurring in the second cell includes at least one of:
    triggering in the first cell a beam failure recovery procedure for the beam failure occurring in the second cell;
    triggering in the second cell a beam failure recovery procedure for the beam failure occurring in the second cell;
    triggering in the first cell and the second cell a beam failure recovery procedure for the beam failure occurring in the second cell.

Optionally, the first cell is a primary cell, and the second cell is an Scell; or
  the first cell is an Scell, and the second cell is a primary cell; or
  the first cell is an Scell, and the second cell is another Scell.

Optionally, the primary cell includes at least one of: a Pcell, a Pcell in an MCG, a PScell in an SCG and an Spcell.

Optionally, that the abnormality occurs in the beam failure recovery procedure includes that the second cell undergoes a beam failure before a preamble is transmitted in the first cell, wherein the preamble is a preamble in a beam failure recovery procedure performed in the first cell after the first cell undergoes a beam failure;
  that the at least two cells both undergo the beam failure recovery includes that both the first cell and the second cell undergo a beam failure recovery.

Optionally, the specific operation includes at least one of:
  performing in a primary cell a beam failure recovery for the primary cell;
  performing in the primary cell a beam failure recovery for an Scell;
  performing in a cell with a specific candidate beam a beam failure recovery for the cell, wherein a random access resource corresponding to the specific candidate beam is a contention-free random access resource;
  performing in the Scell a beam failure recovery for the Scell;
  performing in the Scell a beam failure recovery for the primary cell;
  performing a beam failure recovery in the primary cell and the S cell simultaneously;
  performing in the primary cell a beam failure recovery for the primary cell and after the beam failure recovery is finished, performing in the Scell a beam failure recovery for the Scell;
  wherein the first cell is the primary cell and the second cell is the Scell, or the first cell is the Scell and the second cell is the primary cell.

Optionally, the performing in the primary cell the beam failure recovery for the primary cell includes:
  in a case that multiple cells each have a candidate beam whose corresponding random access resource is a CFRA resource, performing in the primary cell the beam failure recovery for the primary cell;
the performing in the Scell the beam failure recovery for the Scell includes:
  in a case that multiple cells each have a candidate beam whose corresponding random access resource is a CFRA resource, performing in the Scell the beam failure recovery for the Scell.

Optionally, in the specific operation, in a case that a beam failure recovery is performed in a cell, a beam failure in another cell is ignored or a beam failure recovery in another cell is prevented; or
  in a case that an uplink transmission power of the terminal does not support preamble transmission in two cells, a beam failure recovery is only performed in one cell in the specific operation; or
  in a case that an uplink transmission power of the terminal supports preamble transmission in two cells, a beam failure recovery is performed in the two cells simultaneously in the specific operation.

Optionally, if that the abnormality occurs in the beam failure recovery procedure includes that a beam failure recovery in a primary cell is prevented or ignored, the specific operation includes cancelling at least one of following operations:
  triggering an indication of a beam failure recovery of the primary cell to an upper layer;
  triggering an RLF by an upper layer;
  starting a timer corresponding to an RLM or RLF;
  performing an out-of-sync counting by an upper layer.

The terminal according to the embodiment of the present disclosure may implement various processes implemented by a terminal in the method embodiment of FIG. 2 (to avoid repetition, a detailed description thereof is omitted), so as to improve beam failure processing performance of a terminal.

Figure 4:
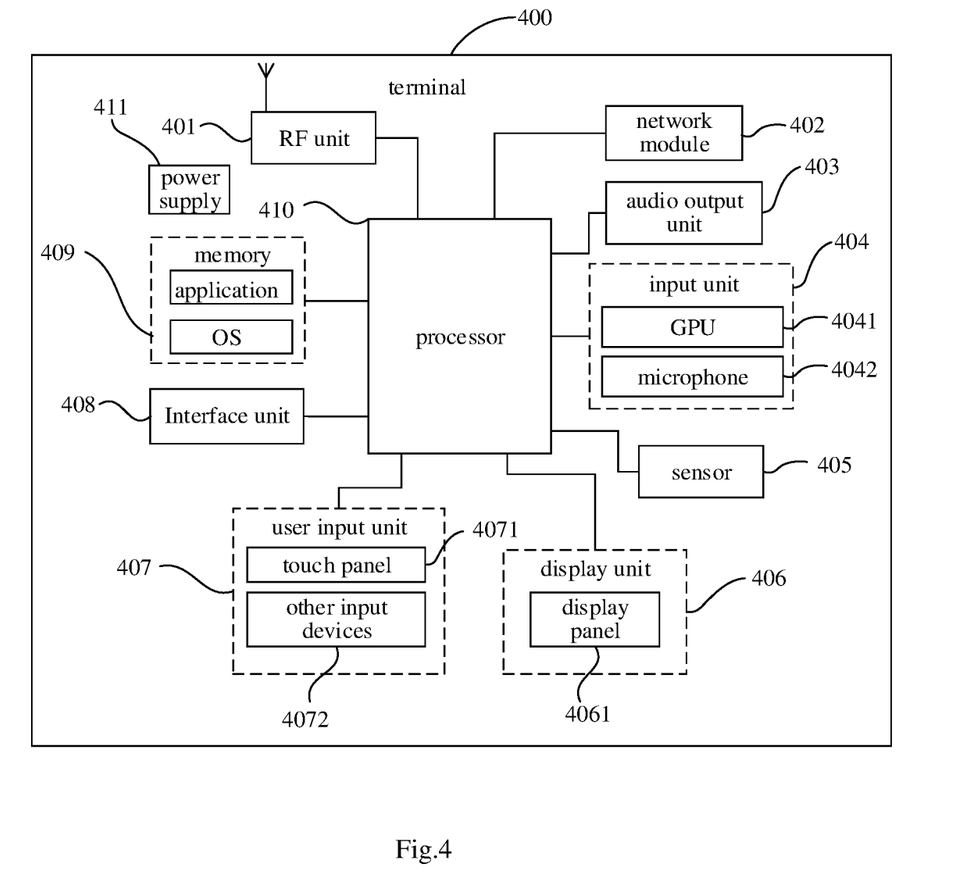
FIG. 4 is a structural diagram of another terminal according to an embodiment of the present disclosure.

FIG. 4 is a schematic hardware structure diagram of a terminal implementing various embodiments of the present disclosure.

The terminal 400 includes, but is not limited to: a radio frequency (Radio Frequency, RF) unit 401, a network module 402, an audio output unit 403, an input unit 404, a sensor 405, a display unit 406, a user input unit 407, an interface unit 408, a memory 409, a processor 410, a power supply 411 and the like. It is appreciated by those skilled in the art, the terminal structure as shown in FIG. 4 does not constitute a limitation on the terminal. The terminal may include more or less components than those as shown, or some components may be combined, or the components may have a different layout. In embodiments of the present disclosure, the terminal includes, but is not limited to: a mobile phone, a tablet computer, a notebook computer, a palmtop computer, an in-vehicle terminal, a wearable device, a pedometer and the like.

The processor 410 is configured to: determine a beam failure recovery event, wherein the beam failure recovery event includes that an abnormality occurs in a beam failure recovery procedure or at least two cells both undergo a beam failure recovery; execute a specific operation according to the beam failure recovery event.

Optionally, that the abnormality occurs in the beam failure recovery procedure includes that a beam failure occurs in a first cell during a beam failure recovery procedure performed in the first cell, or a beam failure occurs in a second cell during the beam failure recovery procedure performed in the first cell.

Optionally, in a case that the beam failure occurs in the first cell during the beam failure recovery procedure performed in the first cell, the specific operation includes at least one of:
  stopping a beam failure recovery procedure being performed in the first cell;
  stopping a beam failure recovery procedure being performed in the second cell;
  stopping a beam failure recovery procedure being performed in the first cell and the second cell;
  performing in the first cell a beam failure recovery for the beam failure occurring in the first cell;
  reporting to an upper layer the beam failure occurring in the first cell;
  performing in the first cell a beam failure recovery for the beam failure occurring in the first cell, and continuing performing a beam failure recovery procedure being performed in the first cell;
  performing in the first cell a beam failure recovery for the beam failure occurring in the first cell after a beam failure recovery procedure being performed in the first cell is finished;
  ignoring the beam failure occurring in the first cell;
  in a case that the beam failure occurs in the second cell during the beam failure recovery procedure performed in the first cell, the specific operation includes at least one of:
    ignoring the beam failure occurring in the second cell;
    performing a beam failure recovery for the beam failure occurring in the second cell;
    performing in the second cell a beam failure recovery, and continuing performing a beam failure recovery procedure being performed in the first cell;
    performing in the second cell a beam failure recovery after a beam failure recovery procedure being performed in the first cell is finished.

Optionally, in case of reporting to the upper layer the beam failure occurring in the first cell, an RLF is triggered, an out-of-sync counter is incremented, or a timer corresponding to an RLM or RLF is started;
  the ignoring the beam failure occurring in the second cell includes at least one of:
    not triggering a beam failure recovery procedure in the second cell;
    not triggering in the first cell a beam failure recovery procedure for the beam failure occurring in the second cell;
    not triggering in the first cell and the second cell a beam failure recovery procedure for the beam failure occurring in the second cell;
  the ignoring the beam failure occurring in the first cell includes at least one of:
    not triggering a beam failure recovery in the first cell;
    not triggering in the second cell a beam failure recovery procedure for the beam failure occurring in the first cell;
    not triggering in the first cell and the second cell a beam failure recovery procedure for the beam failure occurring in the first cell;
  the performing the beam failure recovery for the beam failure occurring in the second cell includes at least one of:

triggering in the first cell a beam failure recovery procedure for the beam failure occurring in the second cell;

triggering in the second cell a beam failure recovery procedure for the beam failure occurring in the second cell;

triggering in the first cell and the second cell a beam failure recovery procedure for the beam failure occurring in the second cell.

Optionally, the first cell is a primary cell, and the second cell is an Scell; or the first cell is an Scell, and the second cell is a primary cell; or the first cell is an Scell, and the second cell is another Scell.

Optionally, the primary cell includes at least one of: a Pcell, a Pcell in an MCG, a PScell in an SCG and an Spcell.

Optionally, that the abnormality occurs in the beam failure recovery procedure includes that the second cell undergoes a beam failure before a preamble is transmitted in the first cell, wherein the preamble is a preamble in a beam failure recovery procedure performed in the first cell after the first cell undergoes a beam failure;

that the at least two cells both undergo the beam failure recovery includes that both the first cell and the second cell undergo a beam failure recovery.

Optionally, the specific operation includes at least one of:
performing in a primary cell a beam failure recovery for the primary cell;
performing in the primary cell a beam failure recovery for an Scell;
performing in a cell with a specific candidate beam a beam failure recovery for the cell, wherein a random access resource corresponding to the specific candidate beam is a contention-free random access resource;
performing in the Scell a beam failure recovery for the Scell;
performing in the Scell a beam failure recovery for the primary cell;
performing a beam failure recovery in the primary cell and the S cell simultaneously;
performing in the primary cell a beam failure recovery for the primary cell and after the beam failure recovery is finished, performing in the Scell a beam failure recovery for the Scell;
wherein the first cell is the primary cell and the second cell is the Scell, or the first cell is the Scell and the second cell is the primary cell.

Optionally, the performing in the primary cell the beam failure recovery for the primary cell includes:
in a case that multiple cells each have a candidate beam whose corresponding random access resource is a CFRA resource, performing in the primary cell the beam failure recovery for the primary cell;
the performing in the Scell the beam failure recovery for the Scell includes:
in a case that multiple cells each have a candidate beam whose corresponding random access resource is a CFRA resource, performing in the Scell the beam failure recovery for the Scell.

Optionally, in the specific operation, in a case that a beam failure recovery is performed in a cell, a beam failure in another cell is ignored or a beam failure recovery in another cell is prevented; or in a case that an uplink transmission power of the terminal does not support preamble transmission in two cells, a beam failure recovery is only performed in one cell in the specific operation; or in a case that an uplink transmission power of the terminal supports preamble transmission in two cells, a beam failure recovery is performed in the two cells simultaneously in the specific operation.

Optionally, if that the abnormality occurs in the beam failure recovery procedure includes that a beam failure recovery in a primary cell is prevented or ignored, the specific operation includes cancelling at least one of following operations:

triggering an indication of a beam failure recovery of the primary cell to an upper layer;
triggering an RLF by an upper layer;
starting a timer corresponding to an RLM or RLF;
performing an out-of-sync counting by an upper layer.

It is understood, in embodiments of the present disclosure, the RF unit 401 may be configured to receive and transmit signals during information transmission or during a call. Specifically, the RF unit 401 receives downlink data from a base station and transfers the data to the processor 410 for processing; and the RF unit 401 transmits uplink data to the base station. Generally, the RF unit 401 includes, but is not limited to: an antenna, at least one amplifier, a transceiver, a coupler, a low noise amplifier, a duplexer and the like. In addition, the RF unit 401 may be configured to communicate with a network or other device through a wireless communications system.

By means of the network module 402, the terminal provides user with wireless broadband Internet access, such as sending and receiving emails, browsing webpages and accessing streamed media.

The audio output unit 403 may convert audio data received by the RF unit 401 or network module 402 or stored in the memory 409 into audio signals and output audibly. Moreover, the audio output unit 403 may provide audio outputs associated with the specific functions performed by the terminal 400 (such as, incoming call ringtone, message received ringtone). The audio output unit 403 includes a speaker, a buzzer, a telephone receiver and the like.

The input unit 404 is configured to receive audio or video signals. The input unit 404 may include a graphics processing unit (Graphics Processing Unit, GPU) 4041 and a microphone 4042. The GPU 4041 processes image data such as still picture or video acquired by an image capture device (e.g., a camera) in a video capture mode or image capture mode. The processed image frames may be displayed on the display unit 406. The image frames processed by the GPU 4041 may be stored in the memory 409 (or other storage medium) or sent via the RF unit 401 or network module 402. The microphone 4042 may pick up sound and convert it into audio data. In a phone call mode, the processed audio data may be converted into a format suitable for transmission to a mobile communication base station via the RF unit 401 and output.

The terminal 400 further includes at least one sensor 405, for example, an optical sensor, a motion sensor, among others. In specific, the optical sensor includes ambient light sensor and proximity sensor. The ambient light sensor may adjust a brightness of a display panel 4061 according to the ambient light conditions. The proximity sensor may deactivate the display panel 4061 and/or a backlight when the terminal 400 is moved close to an ear. As a kind of motion sensor, an acceleration sensor may detect a magnitude of acceleration on each direction (generally, on three axes).

While remaining still, the acceleration sensor may detect the magnitude and direction of gravity, which may be used in posture identification of the terminal (e.g., switch between portrait and landscape modes, related games, magnetometer posture calibration), vibration identification related function (e.g., pedometer, knock) and the like; the sensor 405 may further include a fingerprint sensor, a pressure sensor, an iris sensor, a molecule sensor, a gyroscope, a barometer, a hygrometer, a thermometer, an infrared sensor and the like, which is not described in detail herein.

The display unit 406 is configured to display information input by or presented to a user. The display unit 406 may include a display panel 4061. The display panel 4061 may be constructed in form of liquid crystal display (Liquid Crystal Display, LCD), organic light-emitting diode (Organic Light-Emitting Diode, OLED) and the like.

The user input unit 407 may be configured to receive input numerical information or character information, and generate key signal inputs related to the user setting and function control of the terminal. In specific, the user input unit 407 includes a touch panel 4071 and other input devices 4072. The touch panel 4071, also known as touch screen, may detect the touches thereon or in the vicinity thereof performed by the user (such as touch operations performed on or in the vicinity of the touch panel 4071 by the user using a finger, stylus or any other suitable object or accessory). The touch panel 4071 may include a touch detector and a touch controller. Wherein, the touch detector detects the position where the user touched and the signal resulting from the touch operation, and conveys the signal to the touch controller; the touch controller receives the touch information from the touch detector, converts the information into coordinates of the touch and conveys the coordinates to the processor 410, as well as receives and executes the commands from the processor 410. Further, the touch panel 4071 may be implemented in a variety of modes, such as resistance, capacitance, infrared and surface acoustic wave. In addition to the touch panel 4071, the user input unit 407 may include other input devices 4072. In specific, the other input devices 4072 may include, but is not limited to: physical keyboard, functional keys (such as volume button, switch button, etc.), track ball, mouse, joystick, which is not described in detail herein.

Further, the touch panel 4071 may overlie the display panel 4061. Having detected a touch operation thereon or in the vicinity thereof, the touch panel 4071 conveys the detected touch signal to the processor 410 to categorize the touch event, and the processor 410 provides corresponding visual output on the display panel 4061 in accordance with the category of the touch event. Although, in FIG. 4, the touch panel 4071 and the display panel 4061 are provided as two separate parts to implement the input and output function of the terminal, the touch panel 4071 and the display panel 4061 may be integrated to implement the input and output function of the terminal in some embodiments, which is not limited herein.

The interface unit 408 is an interface by which an external device is connected to the terminal 400. For example, the external device may include a wired or wireless headset port, an external power supply (or battery charger) port, a wired or wireless data port, a storage card port, a port configured to be connected to a device having an identification module, an audio input/output (Input/Output, I/O) port, a video I/O port, an earphone port and the like. The interface unit 408 may be configured to receive input (e.g., data information, power, etc.) from the external device and transfer the received input to one or more components in the terminal 400, or may be configured to transmit data between the terminal 400 and the external device.

The memory 409 may be configured to store software program and other data. The memory 409 may include generally a program storage area and a data storage area. The program storage area may store an operating system (Operating System, OS), an application required for at least one function (such as an audio playing function and an image playback function) and the like; the data storage area may store data (e.g., audio data, phone book, etc.) created according to usage of a mobile phone, and the like. Moreover, the memory 409 may include a cache, as well as a non-volatile storage, such as at least one disk storage device, flash memory or other non-volatile solid-state storage devices.

The processor 410 is a control center of the terminal. The processor 410 is connected to various parts of the entire terminal through various interfaces and lines, and performs various functions of the terminal and processes data by executing or running software programs and/or modules stored in the memory 409 and invoking data stored in the memory 409, so as to achieve an overall monitoring of the terminal. The processor 410 may include one or more processing units; optionally, the processor 410 may integrate an application processor and a modem, wherein the application processor is mainly responsible for executing an operating system, a user interface, an application, etc., while the modem is mainly responsible for handling wireless communication. It is understood, the modem may be not integrated in the processor 410.

The terminal 400 may further include a power supply 411 (e.g., a battery) providing power to various components. Optionally, the power supply 411 may be logically connected to the processor 410 via a power management system, such that functions such as charging management, discharging management and power management may be achieved through the power management system.

Further, the terminal 400 includes some functional modules not shown in the figure, which are not described herein.

Optionally, an embodiment of the present disclosure further provides a terminal, including a processor 410, a memory 409 and a computer program stored in the memory 409 and configured to be executed by the processor 410, wherein the processor 410 is configured to execute the computer program to implement various processes of the embodiments of the foregoing method for processing beam failure, and may achieve the same technical effects. To avoid repetition, a detailed description thereof is omitted herein.

Optionally, an embodiment of the present disclosure further provides a computer readable storage medium storing therein a computer program, wherein the computer program is configured to be executed by a processor to implement various processes of the foregoing method for processing beam failure provided in embodiments of the present disclosure, and may achieve the same technical effects. To avoid repetition, a detailed description thereof is omitted herein. The computer readable storage medium includes a read-only memory (Read-Only Memory, ROM), a random access memory (Random Access Memory, RAM), a magnetic disk, an optic disc or the like.

It should be noted that the terms "include", "have", or any variation thereof used herein are intended to cover a non-exclusive inclusion, such that a process, a method, an article, or a device that includes a list of elements not only includes the list of elements, but also may include other elements not expressly listed or include elements inherent to the process, the method, the article, or the device. In case that there is no further limitation, an element preceded by "includes or including" does not preclude existence of additional identical elements in the process, the method, the article, or the device including the element.

From the foregoing description of the embodiments, a person skilled in the art will clearly appreciate that the method according to the embodiments may be implemented not only by software in conjunction with necessary generic hardware platform, but also by hardware, although the former will be preferred in most cases. Based on such an understanding, essential parts, or parts contributing to the related art, of the technical solution of the present disclosure may be implemented in form of a software product. The software product is stored in a storage medium (e.g., an ROM/RAM, a magnetic disk and an optical disc) and includes several instructions configured to be executed by a terminal (such as a handset, a computer, a server, or a network device) to perform the method according to the embodiments of the present disclosure.

The embodiments of the present disclosure are described above with reference to the accompanying drawings. However, the present disclosure is not limited to the foregoing specific implementations. The foregoing specific implementations are merely illustrative rather than limitative. In light of the teachings of the present disclosure, a person of ordinary skill in the art may further make various forms without departing from the spirit of the present disclosure and the scope of the claims, and these forms all fall within the scope of the present disclosure.

What is claimed is:

1. A method for processing beam failure, performed by a terminal, the method comprising:
    determining a beam failure recovery event, wherein the beam failure recovery event comprises that an abnormality occurs in a beam failure recovery procedure or at least two cells both undergo a beam failure recovery; and
    executing a specific operation according to the beam failure recovery event,
    wherein that the abnormality occurs in the beam failure recovery procedure comprises that when there is a beam failure occurred in a first cell and a beam failure recovery procedure is performed for the beam failure occurred in the first cell, another beam failure occurs in a second cell; or
    wherein that the at least two cells both undergo the beam failure recovery comprises that in the condition that both the first cell and the second cell have undergone their respective first beam failures, when respective second beam failures occur in the first cell and in the second cell, respective beam failure recovery procedures are performed for respective second beam failures occurred in the first cell and in the second cell,
    wherein the first cell is a primary cell (Pcell), and the second cell is a secondary cell (Scell),
    wherein in the case that the other beam failure occurred in the second cell and a corresponding beam failure recovery procedure is performed for the other beam failure occurred in the second cell, when there is the beam failure occurred in the first cell and the beam failure recovery procedure is performed for the beam failure occurred in the first cell, the specific operation comprises stopping the beam failure recovery procedure being performed in the second cell; or
    wherein in the case that the respective beam failure recovery procedures are performed for respective second beam failures occurred in the first cell and in the second cell, when the respective second beam failures occurred in the first cell and in the second cell, the specific operation comprises stopping the beam failure recovery procedure being performed in the second cell.

2. The method according to claim 1, wherein, in a case that the beam failure occurs in the first cell during the beam failure recovery procedure performed in the first cell, the specific operation further comprises at least one of:
    stopping a beam failure recovery procedure being performed in the first cell;
    stopping a beam failure recovery procedure being performed in the first cell and the second cell;
    performing in the first cell a beam failure recovery for the beam failure occurring in the first cell;
    reporting to an upper layer the beam failure occurring in the first cell;
    performing in the first cell a beam failure recovery for the beam failure occurring in the first cell, and continuing performing a beam failure recovery procedure being performed in the first cell;
    performing in the first cell a beam failure recovery for the beam failure occurring in the first cell after a beam failure recovery procedure being performed in the first cell is finished;
    ignoring the beam failure occurring in the first cell;
    in a case that the beam failure occurs in the second cell during the beam failure recovery procedure performed in the first cell, the specific operation comprises at least one of:
        ignoring the beam failure occurring in the second cell;
        performing a beam failure recovery for the beam failure occurring in the second cell;
        performing in the second cell a beam failure recovery, and continuing performing a beam failure recovery procedure being performed in the first cell;
        performing in the second cell a beam failure recovery after a beam failure recovery procedure being performed in the first cell is finished.

3. The method according to claim 2, wherein in case of reporting to the upper layer the beam failure occurring in the first cell, a radio link failure (RLF) is triggered, an out-of-sync counter is incremented, or a timer corresponding to a radio link monitoring (RLM) or RLF is started;
    the ignoring the beam failure occurring in the second cell comprises at least one of:
        not triggering a beam failure recovery procedure in the second cell;
        not triggering in the first cell a beam failure recovery procedure for the beam failure occurring in the second cell;
        not triggering in the first cell and the second cell a beam failure recovery procedure for the beam failure occurring in the second cell;
    the ignoring the beam failure occurring in the first cell comprises at least one of:
        not triggering a beam failure recovery in the first cell;
        not triggering in the second cell a beam failure recovery procedure for the beam failure occurring in the first cell;
        not triggering in the first cell and the second cell a beam failure recovery procedure for the beam failure occurring in the first cell;
    the performing the beam failure recovery for the beam failure occurring in the second cell comprises at least one of:
        triggering in the first cell a beam failure recovery procedure for the beam failure occurring in the second cell;

triggering in the second cell a beam failure recovery procedure for the beam failure occurring in the second cell;
triggering in the first cell and the second cell a beam failure recovery procedure for the beam failure occurring in the second cell.

4. The method according to claim 1, wherein
the first cell is an Scell, and the second cell is a primary cell; or
the first cell is an Scell, and the second cell is another Scell,
wherein the primary cell comprises at least one of: a primary cell (Pcell), a Pcell in a master cell group (MCG), a primary secondary cell (PScell) in a secondary cell group (SCG) and a special cell (Spcell).

5. The method according to claim 1, wherein the specific operation comprises at least one of:
performing in a primary cell a beam failure recovery for the primary cell;
performing in the primary cell a beam failure recovery for a secondary cell (Scell);
performing in a cell with a specific candidate beam a beam failure recovery for the cell, wherein a random access resource corresponding to the specific candidate beam is a contention-free random access (CFRA) resource;
performing in the Scell a beam failure recovery for the Scell;
performing in the Scell a beam failure recovery for the primary cell;
performing a beam failure recovery in the primary cell and the Scell simultaneously;
performing in the primary cell a beam failure recovery for the primary cell and after the beam failure recovery is finished, performing in the Scell a beam failure recovery for the Scell,
wherein the first cell is the primary cell and the second cell is the Scell, or the first cell is the Scell and the second cell is the primary cell.

6. The method according to claim 5, wherein the performing in the primary cell the beam failure recovery for the primary cell comprises:
in a case that multiple cells each have a candidate beam whose corresponding random access resource is a CFRA resource, performing in the primary cell the beam failure recovery for the primary cell;
the performing in the Scell the beam failure recovery for the Scell comprises:
in a case that multiple cells each have a candidate beam whose corresponding random access resource is a CFRA resource, performing in the Scell the beam failure recovery for the Scell,
wherein, in the specific operation, in a case that a beam failure recovery is performed in a cell, a beam failure in another cell is ignored or a beam failure recovery in another cell is prevented; or
in a case that an uplink transmission power of the terminal does not support preamble transmission in two cells, a beam failure recovery is only performed in one cell in the specific operation; or
in a case that an uplink transmission power of the terminal supports preamble transmission in two cells, a beam failure recovery is performed in the two cells simultaneously in the specific operation.

7. The method according to claim 1, wherein, if that the abnormality occurs in the beam failure recovery procedure comprises that a beam failure recovery in a primary cell is prevented or ignored, the specific operation comprises cancelling at least one of following operations:
triggering an indication of a beam failure recovery of the primary cell to an upper layer;
triggering an RLF by an upper layer;
starting a timer corresponding to an RLM or RLF;
performing an out-of-sync counting by an upper layer.

8. A terminal, comprising: a memory, a processor and a program stored in the memory and configured to be executed by the processor, wherein the processor is configured to execute the program to implement steps of a method for processing beam failure, performed by the terminal, the method comprising:
determining a beam failure recovery event, wherein the beam failure recovery event comprises that an abnormality occurs in a beam failure recovery procedure or at least two cells both undergo a beam failure recovery; and
executing a specific operation according to the beam failure recovery event,
wherein that the abnormality occurs in the beam failure recovery procedure comprises that when there is a beam failure occurred in a first cell and a beam failure recovery procedure is performed for the beam failure occurred in the first cell, another beam failure occurs in a second cell; or
wherein that the at least two cells both undergo the beam failure recovery comprises that in the condition that both the first cell and the second cell have undergone their respective first beam failures, when respective second beam failures occur in the first cell and in the second cell, respective beam failure recovery procedures are performed for respective second beam failures occurred in the first cell and in the second cell,
wherein the first cell is a primary cell (Pcell), and the second cell is a secondary cell (Scell), wherein in the case that the other beam failure occurred in the second cell and a corresponding beam failure recovery procedure is performed for the other beam failure occurred in the second cell, when there is the beam failure occurred in the first cell and the beam failure recovery procedure is performed for the beam failure occurred in the first cell, the specific operation comprises stopping the beam failure recovery procedure being performed in the second cell; or
wherein in the case that the respective beam failure recovery procedures are performed for respective second beam failures occurred in the first cell and in the second cell, when the respective second beam failures occurred in the first cell and in the second cell, the specific operation comprises stopping the beam failure recovery procedure being performed in the second cell.

9. The terminal according to claim 8, wherein, in a case that the beam failure occurs in the first cell during the beam failure recovery procedure performed in the first cell, the specific operation further comprises at least one of:
stopping a beam failure recovery procedure being performed in the first cell;
stopping a beam failure recovery procedure being performed in the first cell and the second cell;
performing in the first cell a beam failure recovery for the beam failure occurring in the first cell;
reporting to an upper layer the beam failure occurring in the first cell;

performing in the first cell a beam failure recovery for the beam failure occurring in the first cell, and continuing performing a beam failure recovery procedure being performed in the first cell;
performing in the first cell a beam failure recovery for the beam failure occurring in the first cell after a beam failure recovery procedure being performed in the first cell is finished;
ignoring the beam failure occurring in the first cell;
in a case that the beam failure occurs in the second cell during the beam failure recovery procedure performed in the first cell, the specific operation comprises at least one of:
ignoring the beam failure occurring in the second cell;
performing a beam failure recovery for the beam failure occurring in the second cell;
performing in the second cell a beam failure recovery, and continuing performing a beam failure recovery procedure being performed in the first cell;
performing in the second cell a beam failure recovery after a beam failure recovery procedure being performed in the first cell is finished.

10. The terminal according to claim 9, wherein in case of reporting to the upper layer the beam failure occurring in the first cell, a radio link failure (RLF) is triggered, an out-of-sync counter is incremented, or a timer corresponding to a radio link monitoring (RLM) or RLF is started;
the ignoring the beam failure occurring in the second cell comprises at least one of:
not triggering a beam failure recovery procedure in the second cell;
not triggering in the first cell a beam failure recovery procedure for the beam failure occurring in the second cell;
not triggering in the first cell and the second cell a beam failure recovery procedure for the beam failure occurring in the second cell;
the ignoring the beam failure occurring in the first cell comprises at least one of:
not triggering a beam failure recovery in the first cell;
not triggering in the second cell a beam failure recovery procedure for the beam failure occurring in the first cell;
not triggering in the first cell and the second cell a beam failure recovery procedure for the beam failure occurring in the first cell;
the performing the beam failure recovery for the beam failure occurring in the second cell comprises at least one of:
triggering in the first cell a beam failure recovery procedure for the beam failure occurring in the second cell;
triggering in the second cell a beam failure recovery procedure for the beam failure occurring in the second cell;
triggering in the first cell and the second cell a beam failure recovery procedure for the beam failure occurring in the second cell.

11. The terminal according to claim 8, wherein
the first cell is an Scell, and the second cell is a primary cell; or
the first cell is an Scell, and the second cell is another Scell,
wherein the primary cell comprises at least one of: a primary cell (Pcell), a Pcell in a master cell group (MCG), a primary secondary cell (PScell) in a secondary cell group (SCG) and a special cell (Spcell).

12. The terminal according to claim 8, wherein the specific operation comprises at least one of:
performing in a primary cell a beam failure recovery for the primary cell;
performing in the primary cell a beam failure recovery for a secondary cell (Scell);
performing in a cell with a specific candidate beam a beam failure recovery for the cell, wherein a random access resource corresponding to the specific candidate beam is a contention-free random access (CFRA) resource;
performing in the Scell a beam failure recovery for the Scell;
performing in the Scell a beam failure recovery for the primary cell;
performing a beam failure recovery in the primary cell and the Scell simultaneously;
performing in the primary cell a beam failure recovery for the primary cell and after the beam failure recovery is finished, performing in the Scell a beam failure recovery for the Scell,
wherein the first cell is the primary cell and the second cell is the Scell, or the first cell is the Scell and the second cell is the primary cell.

13. The terminal according to claim 12, wherein the performing in the primary cell the beam failure recovery for the primary cell comprises:
in a case that multiple cells each have a candidate beam whose corresponding random access resource is a CFRA resource, performing in the primary cell the beam failure recovery for the primary cell;
the performing in the Scell the beam failure recovery for the Scell comprises:
in a case that multiple cells each have a candidate beam whose corresponding random access resource is a CFRA resource, performing in the Scell the beam failure recovery for the Scell,
wherein, in the specific operation, in a case that a beam failure recovery is performed in a cell, a beam failure in another cell is ignored or a beam failure recovery in another cell is prevented; or
in a case that an uplink transmission power of the terminal does not support preamble transmission in two cells, a beam failure recovery is only performed in one cell in the specific operation; or
in a case that an uplink transmission power of the terminal supports preamble transmission in two cells, a beam failure recovery is performed in the two cells simultaneously in the specific operation.

14. The terminal according to claim 8, wherein, if that the abnormality occurs in the beam failure recovery procedure comprises that a beam failure recovery in a primary cell is prevented or ignored, the specific operation comprises cancelling at least one of following operations:
triggering an indication of a beam failure recovery of the primary cell to an upper layer;
triggering an RLF by an upper layer;
starting a timer corresponding to an RLM or RLF;
performing an out-of-sync counting by an upper layer.

15. A non-transitory computer readable storage medium storing therein a program, wherein the program is configured to be executed by a processor to implement steps of a method for processing beam failure, performed by a terminal, the method comprising:
determining a beam failure recovery event, wherein the beam failure recovery event comprises that an abnormality occurs in a beam failure recovery procedure or at least two cells both undergo a beam failure recovery;

executing a specific operation according to the beam failure recovery event, wherein that the abnormality occurs in the beam failure recovery procedure comprises that when there is a beam failure occurred in a first cell and a beam failure recovery procedure is performed for the beam failure occurred in the first cell, another beam failure occurs in a second cell; or wherein that the at least two cells both undergo the beam failure recovery comprises that in the condition that both the first cell and the second cell have undergone their respective first beam failures, when respective second beam failures occur in the first cell and in the second cell, respective beam failure recovery procedures are performed for respective second beam failures occurred in the first cell and in the second cell, wherein the first cell is a primary cell (Pcell), and the second cell is a secondary cell (Scell), wherein in the case that the other beam failure occurred in the second cell and a corresponding beam failure recovery procedure is performed for the other beam failure occurred in the second cell, when there is the beam failure occurred in the first cell and the beam failure recovery procedure is performed for the beam failure occurred in the first cell, the specific operation comprises stopping the beam failure recovery procedure being performed in the second cell; or wherein in the case that the respective beam failure recovery procedures are performed for respective second beam failures occurred in the first cell and in the second cell, when the respective second beam failures occurred in the first cell and in the second cell, the specific operation comprises stopping the beam failure recovery procedure being performed in the second cell.

16. The non-transitory computer readable storage medium according to claim 15, wherein, in a case that the beam failure occurs in the first cell during the beam failure recovery procedure performed in the first cell, the specific operation further comprises at least one of:

stopping a beam failure recovery procedure being performed in the first cell;

stopping a beam failure recovery procedure being performed in the first cell and the second cell;

performing in the first cell a beam failure recovery for the beam failure occurring in the first cell;

reporting to an upper layer the beam failure occurring in the first cell;

performing in the first cell a beam failure recovery for the beam failure occurring in the first cell, and continuing performing a beam failure recovery procedure being performed in the first cell;

performing in the first cell a beam failure recovery for the beam failure occurring in the first cell after a beam failure recovery procedure being performed in the first cell is finished;

ignoring the beam failure occurring in the first cell;

in a case that the beam failure occurs in the second cell during the beam failure recovery procedure performed in the first cell, the specific operation comprises at least one of:

ignoring the beam failure occurring in the second cell;

performing a beam failure recovery for the beam failure occurring in the second cell;

performing in the second cell a beam failure recovery, and continuing performing a beam failure recovery procedure being performed in the first cell;

performing in the second cell a beam failure recovery after a beam failure recovery procedure being performed in the first cell is finished.

17. The non-transitory computer readable storage medium according to claim 16, wherein in case of reporting to the upper layer the beam failure occurring in the first cell, a radio link failure (RLF) is triggered, an out-of-sync counter is incremented, or a timer corresponding to a radio link monitoring (RLM) or RLF is started;

the ignoring the beam failure occurring in the second cell comprises at least one of:

not triggering a beam failure recovery procedure in the second cell;

not triggering in the first cell a beam failure recovery procedure for the beam failure occurring in the second cell;

not triggering in the first cell and the second cell a beam failure recovery procedure for the beam failure occurring in the second cell;

the ignoring the beam failure occurring in the first cell comprises at least one of:

not triggering a beam failure recovery in the first cell;

not triggering in the second cell a beam failure recovery procedure for the beam failure occurring in the first cell;

not triggering in the first cell and the second cell a beam failure recovery procedure for the beam failure occurring in the first cell;

the performing the beam failure recovery for the beam failure occurring in the second cell comprises at least one of:

triggering in the first cell a beam failure recovery procedure for the beam failure occurring in the second cell;

triggering in the second cell a beam failure recovery procedure for the beam failure occurring in the second cell;

triggering in the first cell and the second cell a beam failure recovery procedure for the beam failure occurring in the second cell.

18. The non-transitory computer readable storage medium according to claim 15, wherein the first cell is an Scell, and the second cell is a primary cell; or the first cell is an Scell, and the second cell is another Scell, wherein the primary cell comprises at least one of: a primary cell (Pcell), a Pcell in a master cell group (MCG), a primary secondary cell (PScell) in a secondary cell group (SCG) and a special cell (Spcell).

19. The non-transitory computer readable storage medium according to claim 15, wherein the specific operation comprises at least one of:

performing in a primary cell a beam failure recovery for the primary cell;

performing in the primary cell a beam failure recovery for a secondary cell (Scell);

performing in a cell with a specific candidate beam a beam failure recovery for the cell, wherein a random access resource corresponding to the specific candidate beam is a contention-free random access (CFRA) resource;

performing in the Scell a beam failure recovery for the Scell;

performing in the Scell a beam failure recovery for the primary cell;

performing a beam failure recovery in the primary cell and the Scell simultaneously;

performing in the primary cell a beam failure recovery for the primary cell and after the beam failure recovery is finished, performing in the Scell a beam failure recovery for the Scell, wherein the first cell is the primary cell and the second cell is the Scell, or the first cell is the Scell and the second cell is the primary cell.

20. The non-transitory computer readable storage medium according to claim 19, wherein the performing in the primary cell the beam failure recovery for the primary cell comprises:

in a case that multiple cells each have a candidate beam whose corresponding random access resource is a CFRA resource, performing in the primary cell the beam failure recovery for the primary cell;

the performing in the Scell the beam failure recovery for the Scell comprises:

in a case that multiple cells each have a candidate beam whose corresponding random access resource is a CFRA resource, performing in the Scell the beam failure recovery for the Scell, wherein, in the specific operation, in a case that a beam failure recovery is performed in a cell, a beam failure in another cell is ignored or a beam failure recovery in another cell is prevented; or in a case that an uplink transmission power of the terminal does not support preamble transmission in two cells, a beam failure recovery is only performed in one cell in the specific operation; or in a case that an uplink transmission power of the terminal supports preamble transmission in two cells, a beam failure recovery is performed in the two cells simultaneously in the specific operation.

\* \* \* \* \*